US012812509B2

(12) United States Patent
Fakoorian et al.

(10) Patent No.: US 12,812,509 B2
(45) Date of Patent: Nov. 24, 2026

(54) SIGNALING AND PROCEDURE TO INDICATE A MODE OF COMMUNICATION

(71) Applicant: Apple Inc., Cupertino, CA (US)

(72) Inventors: Seyed Ali Akbar Fakoorian, San Diego, CA (US); Haitong Sun, Cupertino, CA (US); Dawei Zhang, Saratoga, CA (US); Weidong Yang, San Diego, CA (US); Yushu Zhang, Beijing (CN); Chunxuan Ye, San Diego, CA (US); Chunhai Yao, Beijing (CN); Sigen Ye, Cupertino, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 366 days.

(21) Appl. No.: 18/125,004

(22) Filed: Mar. 22, 2023

(65) Prior Publication Data

US 2023/0354157 A1 Nov. 2, 2023

Related U.S. Application Data

(60) Provisional application No. 63/336,054, filed on Apr. 28, 2022.

(51) Int. Cl.
*H04W 48/08* (2009.01)
*H04L 5/14* (2006.01)
*H04W 48/16* (2009.01)

(52) U.S. Cl.
CPC ............... *H04W 48/08* (2013.01); *H04L 5/14* (2013.01); *H04W 48/16* (2013.01)

(58) Field of Classification Search
CPC ..... H04W 48/08; H04W 48/16; H04W 48/12; H04L 5/14; H04L 5/0053; H04L 5/0094
See application file for complete search history.

(56) References Cited

U.S. PATENT DOCUMENTS

2009/0181661 A1* 7/2009 Kitazoe ................. H04W 48/12 455/418
2013/0128782 A1* 5/2013 Boixadera ................. H04L 5/16 370/281

(Continued)

FOREIGN PATENT DOCUMENTS

WO WO-2015196483 A1 * 12/2015 ............ H04W 72/00
WO WO 2019/023885 A1 2/2019

OTHER PUBLICATIONS

Machine translation of WO-2015196483-A1 is attached.*

(Continued)

*Primary Examiner* — Nicholas A Jensen
*Assistant Examiner* — Ayodele Lawrence Olubodun
(74) *Attorney, Agent, or Firm* — Sterne, Kessler, Goldstein & Fox P.L.L.C.

(57) ABSTRACT

Some aspects relate to apparatuses and methods for implementing mechanisms for providing signaling and procedures to indicate a mode of communication of a wireless communication system. For example, a base station is configured to determine a mode of communication for a cell associated with the base station. The mode of communication can include one of a full-duplex mode or a half-duplex mode. The base station can further generate system information to enable initial access by a user equipment (UE) to the cell. A portion of the system information can indicate the mode of communication for the cell. The base station can also transmit the system information to the UE.

12 Claims, 8 Drawing Sheets

(56) References Cited

U.S. PATENT DOCUMENTS

| | | | | |
|---|---|---|---|---|
| 2019/0110291 | A1* | 4/2019 | Yi | H04W 72/0446 |
| 2021/0067308 | A1* | 3/2021 | Ly | H04L 1/08 |
| 2021/0297999 | A1* | 9/2021 | Kim | H04W 72/0453 |
| 2022/0183027 | A1* | 6/2022 | Zhang | H04W 72/1263 |
| 2022/0400451 | A1* | 12/2022 | Luo | H04W 48/16 |
| 2023/0262472 | A1* | 8/2023 | Grant | H04L 5/0048 455/454 |
| 2023/0361957 | A1* | 11/2023 | Abdelghaffar | H04L 5/001 |
| 2024/0015641 | A1* | 1/2024 | Nagano | H04W 4/70 |

OTHER PUBLICATIONS

Machine translation of WO-2015196483-A1 is attached. (Year: 2015).*

IPWIRELESS: "Duplex Capability", 3GPP Draft; R1-060639, 3rd Generation Partnership Project (3GPP), Mobile Competence Centre ; 650, Route Des Lucioles ; F-06921 Sophia-Antipolis Cedex ; France, vol. RAN WG1, No. Denver, USA; Feb. 9, 2006, Feb. 9, 2006 (Feb. 9, 2006), XP050101562; 3 pages.

"3rd Generation Partnership Project; Technical Specification Group Radio Access Network; NR; Radio Resource Control (RRC) protocol specification (Release 17)", 3GPP Standard; Technical Specification; 3GPP TS 38.331, 3rd Generation Partnership Project (3GPP), Mobile Competence Centre ; 650, Route Des Lucioles ; F-06921 Sophia-Antipolis Cedex ; France vol. RAN WG2, No. V17.0.0 Apr. 19, 2022 (Apr. 19, 2022), pp. 1-1221, XP052146036, Retrieved from the Internet: URL:https://ftp.3gpp.org/Specs/archive/38_series/38.331 /38331-h00.zip38331-h00.docx.

International Search Report and Written Opinion directed to related International Application No. PCT/US2023/019794, mailed Aug. 3, 2023, 10 pages.

3GPP TS 22.261 V18.6.0 (Mar. 2022), 3rd Generation Partnership Project; Technical Specification Group Services and System Aspects; Service requirements for the 5G system; Stage 1 (Release 18); 114 pages.

3GPP TS 23.122 V16.12.0 (Mar. 2022), 3rd Generation Partnership Project; Technical Specification Group Core Network and Terminals; Non-Access-Stratum (NAS) functions related to Mobile Station (MS) in idle mode (Release 16); 82 pages.

3GPP TS 23.501 V17.4.0 (Mar. 2022), 3rd Generation Partnership Project; Technical Specification Group Services and System Aspects; System architecture for the 5G System (5GS); Stage 2 (Release 17); 567 pages.

3GPP TS 38.101-1 V17.5.0 (Mar. 2022), 3rd Generation Partnership Project; Technical Specification Group Radio Access Network; NR; User Equipment (UE) radio transmission and reception; Part 1: Range 1 Standalone (Release 17); 669 pages.

3GPP TS 38.211 V17.1.0 (Mar. 2022), 3rd Generation Partnership Project; Technical Specification Group Radio Access Network; NR; Physical channels and modulation (Release 17); 135 pages.

3GPP TS 38.212 V17.1.0 (Mar. 2022), 3rd Generation Partnership Project; Technical Specification Group Radio Access Network; NR; Multiplexing and channel coding (Release 17); 197 pages.

3GPP TS 38.213 V17.1.0 (Mar. 2022), 3rd Generation Partnership Project; Technical Specification Group Radio Access Network; NR; Physical layer procedures for control (Release 17); 245 pages.

3GPP TS 38.304 V16.7.0 (Dec. 2021), 3rd Generation Partnership Project; Technical Specification Group Radio Access Network; NR; User Equipment (UE) procedures in Idle mode and RRC Inactive state (Release 16); 39 pages.

* cited by examiner

300

SIGNALING AND PROCEDURE TO INDICATE A MODE OF COMMUNICATION

REFERENCE TO RELATED APPLICATION

This application claims the benefit of U.S. Provisional Patent Application No. 63/336,054, titled "Signaling and Procedure to Indicate a Mode of Communication," filed on Apr. 28, 2022, the disclosure of which is incorporated by reference herein in its entirety.

BACKGROUND

Field

The described aspects generally relate to wireless communication systems, including one or more signaling and procedures to indicate a mode of communication of a wireless communication system.

Related Art

A wireless communication system can include a fifth generation (5G) system, a New Radio (NR) system, a long term evolution (LTE) system, a combination thereof, or some other wireless systems. In addition, a wireless communication system can support a wide range of frequency bands, such as including, one or more Time Division Duplex (TDD) bands and/or Frequency Division Duplex (FDD) bands. A wireless communication system can communicate in one or more modes in the wide range of frequency bands, such as a full-duplex mode and/or a half-duplex mode.

SUMMARY

Some aspects of this disclosure relate to apparatuses and methods for implementing techniques for providing signaling and procedures to indicate a mode of communication of a wireless communication system. The implemented techniques can be applicable to many wireless systems, e.g., a wireless communication system based on 3rd Generation Partnership Project (3GPP) release 15 (Rel-15), release 16 (Rel-16), release 17 (Rel-17), release 18 (Rel-18), or others.

Some aspects of this disclosure relate to a base station. A base station can include a transceiver configured to wirelessly communicate with a UE, and a processor communicatively coupled to the transceiver. The processor can be configured to determine a mode of communication for a cell associated with the base station. The mode of communication can include one of a full-duplex mode or a half-duplex mode. The processer can be further configured to generate system information to enable initial access by a UE to the cell. A portion of the system information can indicate the mode of communication for the cell. The processer can be further configured to transmit, using the transceiver, the system information to the UE.

According to some aspects, the portion of the system information can include a Master Information Block (MIB) configured to indicate the mode of communication associated with the cell, or a System Information Block (SIB) configured to indicate the mode of communication associated with the cell. The SIB can be a SIB type 1 (SIB1) or an Other System Information (OSI).

According to some aspects, the portion of the system information can include a Master Information Block (MIB), and the MIB can include an intraFrequencyReselection bit configured to indicate whether the cell is operating in full-duplex mode or half-duplex mode, or a spare bit in the MIB configured to indicate whether the cell is operating in full-duplex mode or half-duplex mode, or when the cell is operating in FR1 licensed band, a reserved bit in a PBCH payload configured to indicate whether the cell is operating in the full-duplex mode or the half-duplex mode.

According to some aspects, the processor can be further configured to generate one of the intraFrequencyReselection bit, the spare bit, or the reserved bit in the PBCH payload for inclusion in the MIB to indicate the mode of communication associated with the cell.

According to some aspects, the portion of the system information can include System Information Block (SIB), and the SIB can include a SIB type 1 (SIB1) configured to indicate whether the cell is operating in full-duplex mode or half-duplex mode, or Other System Information (OSI) configured to indicate whether the cell is operating in full-duplex mode or half-duplex mode. The SIB1 can include a parameter in cellSelectionInfo field configured to indicate whether the cell is operating in full-duplex mode or half-duplex mode. The parameter in cellSelectionInfo field can be one of a first offset with respect to an existing cell selection receive value (Srxlev) associated with average interference observed by the UE in full-duplex mode, or a second offset with respect to an existing cell selection quality value (Squal), or a third offset applied to both Srxlev and Sqaul. The OSI can include a new SIB or an existing SIB other than SIB1 configured to have an indication of supporting frequency duplex operation when the cell is operating in full-duplex mode.

Some aspects of this disclosure relate to a UE. A UE can include a transceiver configured to wirelessly communicate with a cell in a wireless network, and a processor communicatively coupled to the transceiver. The processor can be configured to receive, using the transceiver, system information broadcast periodically by the cell in the wireless network. The system information can enable initial access by the UE to the wireless network. The processor can be configured to determine, based a portion of the system information, a mode of communication associated with the cell. The mode of communication can include full-duplex mode or half-duplex mode. The processor can be configured to determine whether to camp on the cell based on the determined mode of communication associated with the cell.

According to some aspects, the portion of the system information can include a Master Information Block (MIB) configured to indicate the mode of communication associated with the cell, or a System Information Block (SIB) configured to indicate the mode of communication associated with the cell. The SIB can be a SIB type 1 (SIB1) or an Other System Information (OSI). The portion of the system information can include a Master Information Block (MIB), and the MIB can include an intraFrequencyReselection bit configured to indicate whether the cell is operating in full-duplex mode or half-duplex mode, or a spare bit in the MIB configured to indicate whether the cell is operating in full-duplex mode or half-duplex mode, or when the cell is operating in FR1 licensed band, a reserved bit in a PBCH payload configured to indicate whether the cell is operating in the full-duplex mode or the half-duplex mode.

According to some aspects, the processor can be further configured to examine one of the intraFrequencyReselection bit, the spare bit, or the reserved bit in the PBCH payload to determine the mode of communication associated with the cell.

The portion of the system information can include System Information Block (SIB), and the SIB can include a SIB type 1 (SIB1) configured to indicate whether the cell is operating in full-duplex mode or half-duplex mode, or Other System Information (OSI) configured to indicate whether the cell is operating in full-duplex mode or half-duplex mode.

The SIB1 can include a parameter in cellSelectionInfo configured to indicate whether the cell is operating in full-duplex mode or half-duplex mode. The parameter in cellSelectionInfo can be one of a first offset with respect to an existing cell selection receive value (Srxlev) associated with average interference observed by the UE in full-duplex mode, or a second offset with respect to an existing cell selection quality value (Squal), or a third offset applied to both Srxlev and Sqaul. The OSI can include a new SIB or an existing SIB other than SIB1 configured to have an indication of supporting frequency duplex operation when the cell is operating in full-duplex mode.

According to some aspects, the processor can be further configured to refrain from, based on the determined mode of communication associated with the cell, camping on the cell, and perform a cell re-selection procedure. The processor can be further configured to establish, based on the determined mode of communication associated with the cell, a connection with the cell to enable the UE to camp on the cell. The processor can be further configured to receive, using the transceiver, an indication of system information update by the cell in the wireless network.

Some aspects of this disclosure relate to a method including determining a mode of communication for a cell associated with a base station. The mode of communication can include one of a full-duplex mode or a half-duplex mode. The method also includes generating system information to enable initial access by a UE to the cell. A portion of the system information can indicate the mode of communication for the cell. The method further includes transmitting the system information to the UE.

Some aspects of this disclosure relate to a method including receiving, by a UE, system information broadcast periodically by a cell in a wireless network. The system information can enable initial access by the UE to the wireless network. The method also includes determining, based a portion of the system information, a mode of communication associated with the cell. The mode of communication can be full-duplex mode or half-duplex mode. The method further includes determining whether to camp on the cell based on the determined mode of communication associated with the cell.

Some aspects of this disclosure relate to a non-transitory computer-readable medium storing instructions. When the instructions are executed by a processor of a base station, the instructions cause the processor to perform operations including determining a mode of communication for a cell associated with a base station. The mode of communication can include one of a full-duplex mode or a half-duplex mode. The operations further include generating system information to enable initial access by a UE to the cell. A portion of the system information can indicate the mode of communication for the cell. The operations also include transmitting the system information to the UE.

Some aspects of this disclosure relate to a non-transitory computer-readable medium storing instructions. When the instructions are executed by a processor of a UE, the instructions cause the processor to perform operations including receiving system information broadcast periodically by a cell in a wireless network. The system information can enable initial access by the UE to the wireless network. The operations further include determining, based a portion of the system information, a mode of communication associated with the cell, wherein the mode of communication is full-duplex mode or half-duplex mode. The operations also include determining whether to camp on the cell based on the determined mode of communication associated with the cell.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
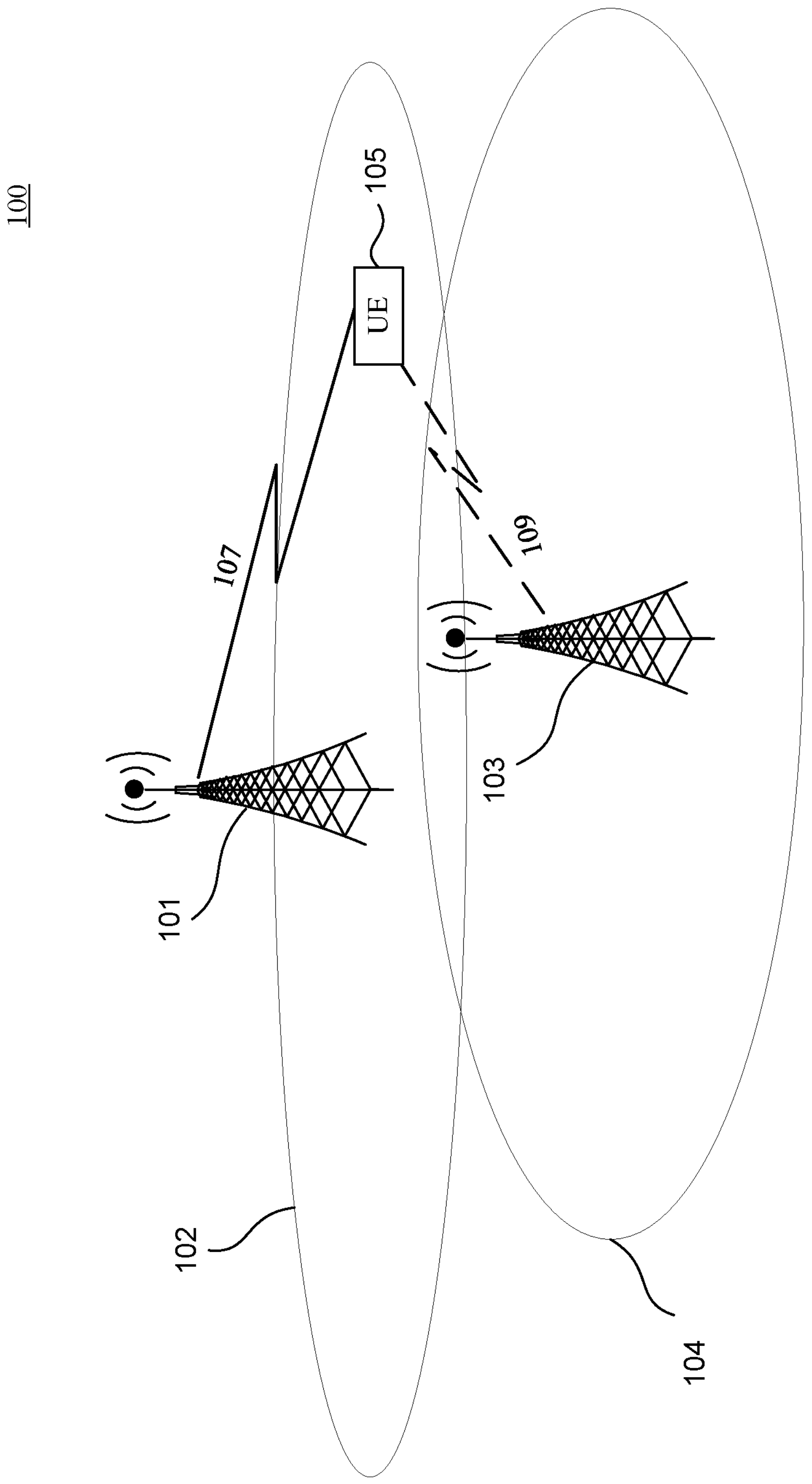
FIG. 1 illustrates an example system implementing mechanisms for providing signaling and procedures to indicate a mode of communication of a wireless communication system, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to apparatuses and methods for implementing techniques for providing signaling and procedures to indicate a full-duplex mode and/or a half-duplex mode of a wireless communication system. The implemented techniques can be applicable to many wireless systems, e.g., a wireless communication system based on 3rd Generation Partnership Project (3GPP) release 15 (Rel-15), release 16 (Rel-16), release 17 (Rel-17), release 18 (Rel-18), or others.

A wireless communication system can include a fifth generation (5G) system, a New Radio (NR) system, a long term evolution (LTE) system, a combination thereof, or some other wireless systems. Duplex schemes used in the wireless communication systems can include Frequency Division Duplex (FDD) and/or Time Division Duplex (TDD). The duplex schemes can be associated with the communication from a UE to a network (e.g., uplink) and from the network to the UE (e.g., downlink). FDD can be used when a wireless network uses two separate frequency bands from the available frequency spectrum respectively dedicated to an uplink band and a downlink band. TDD can be used when a wireless network uses one frequency band both for uplink and downlink but separates the communication through different timeslots. Each of the FDD bands can consist of a pair of frequencies, one for the uplink and another for the downlink. TDD bands can require only a single band which is used for both the uplink and downlink, but is time shared.

A wireless communication system operating in a full-duplex mode of communication can enable simultaneous, or near-simultaneous, transmission and reception. A wireless communication system operating in a half-duplex mode can enable transmission or reception, but not at the same time. A wireless communication system can operate in both FDD (e.g., paired) and TDD (e.g., unpaired) using the same radio frame structure for both duplex schemes. The basic radio frame structure of the wireless communication system may be designed to support both half-duplex and full-duplex modes.

To enhance uplink coverage, one or more wireless systems, such as including a base station or a cell may operate in a full-duplex mode in one or more TDD bands. In some embodiments, a UE can operate in a half-duplex mode and a base station or a cell can operate in a full-duplex mode in a TDD band. When a base station is operating in a full-duplex mode in a TDD band, a UE can observe interference due to the full-duplex mode of the cell. Accordingly, it would be advantageous for the UE to determine the mode of communication associated with the cell before initiating a camping procedure.

Some aspects of this disclosure provide mechanisms for signaling and procedures to indicate a mode of communication of a base station to indicate whether a cell associated with the base station is operating in full-duplex mode or half-duplex mode. The base station can determine the mode of communication for the cell. The mode of communication can include one of the full-duplex mode or the half-duplex mode. The base station can generate system information to enable initial access by a UE to the cell. A portion of the system information can indicate the mode of communication for the cell. The base station can transmit the system information to the UE.

The UE can receive system information broadcast periodically from the cell in the wireless network. The system information can enable initial access by the UE to the wireless network. The UE can determine, based a portion of the system information, the mode of communication associated with the cell prior to the UE camping on the cell. The mode of communication can be full-duplex mode or half-duplex mode.

FIG. 1 illustrates an example system implementing mechanisms for providing signaling and procedures to indicate a mode of communication of a wireless communication system, according to some aspects of the disclosure. Example system 100 is provided for the purpose of illustration only and does not limit the disclosed aspects.

Wireless network 100 includes, but is not limited to, network nodes (for example, base stations such as eNBs, gNBs) 101 and 103 and electronic device (for example, a UE) 105. There can be other network entities, e.g., network controller, a relay station, not shown. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate using Release 18 (Rel-18) or other 3GPP standards. UE 105 can include, but is not limited to: wireless communication devices, smart phones, laptops, desktops, tablets, personal assistants, monitors, televisions, wearable devices, Internet of Things (IoTs), vehicle's communication devices, and the like. Network nodes 101 and 103 (herein referred to as base stations or cells) can include nodes configured to operate based on a wide variety of wireless communication techniques such as, but not limited to, techniques based on 3GPP standards. For example, base stations 101 and 103 can include nodes configured to operate using Rel-18 or other 3GPP standards.

According to some aspects, UE 105 and base stations 101 and 103 are configured to implement mechanisms for providing signaling and procedures to indicate a mode of communication of base stations 101 and 103 and the associated cells. According to some aspects, base station 101 can determine a mode of communication for a cell 102 (e.g., the serving cell) associated with base station 101. The mode of communication can comprise one of a full-duplex mode or a half-duplex mode. Base station 101 can generate system information to enable initial access by a UE to the cell 102. A portion of the system information can indicate the mode of communication for the cell 102, as described in detail with reference to FIGS. 3-5. Base station 101 can transmit the system information to UE 105.

According to some aspects, UE 105 can receive system information broadcast periodically by a cell 102 (via base station 101) in a wireless network 100. The system information can enable initial access by UE 105 to the wireless network 100. UE 105 can determine, based a portion of the system information, a mode of communication associated with the cell 102. The mode of communication can be full-duplex mode or half-duplex mode. The UE 105 can establish, based on the determined mode of communication associated with the cell 102, a connection with the cell 102 to enable UE 105 to camp on the cell 102. Additionally or alternatively, UE 105 can refrain from, based on the determined mode of communication associated with the cell 102, camping on the cell 102, and perform a cell re-selection procedure. UE 105 can receive an indication of system information update by the cell in the wireless network.

According to some aspects, when inter-cell multi-Transmission and Reception Point (TRP) and/or inter-cell mobility is enabled, a mode of communication for base station 103 in a neighbor cell 104 can be configured by a wireless network 100. For example, wireless network 100 can configure a mode of communication for each neighbor cell 104 by Radio Resource Control (RRC) signaling. The mode of communication can comprise one of a full-duplex mode or a half-duplex mode. UE 105 can derive the mode of communication for a neighbor cell 104, by decoding system information from base station 103. The system information can include MIB and SIB. Base station 101 can send signaling (e.g., paging) to UE 105 to indicate the SIB update from base station 103, and the neighbor cell index. Multiple cells, such as the serving cell 102 and one or more neighbor cells 104, can share the same the mode of communication for inter cell multi TP or inter cell mobility. However, the aspects of this disclosure are not limited to these examples.

Figure 2:
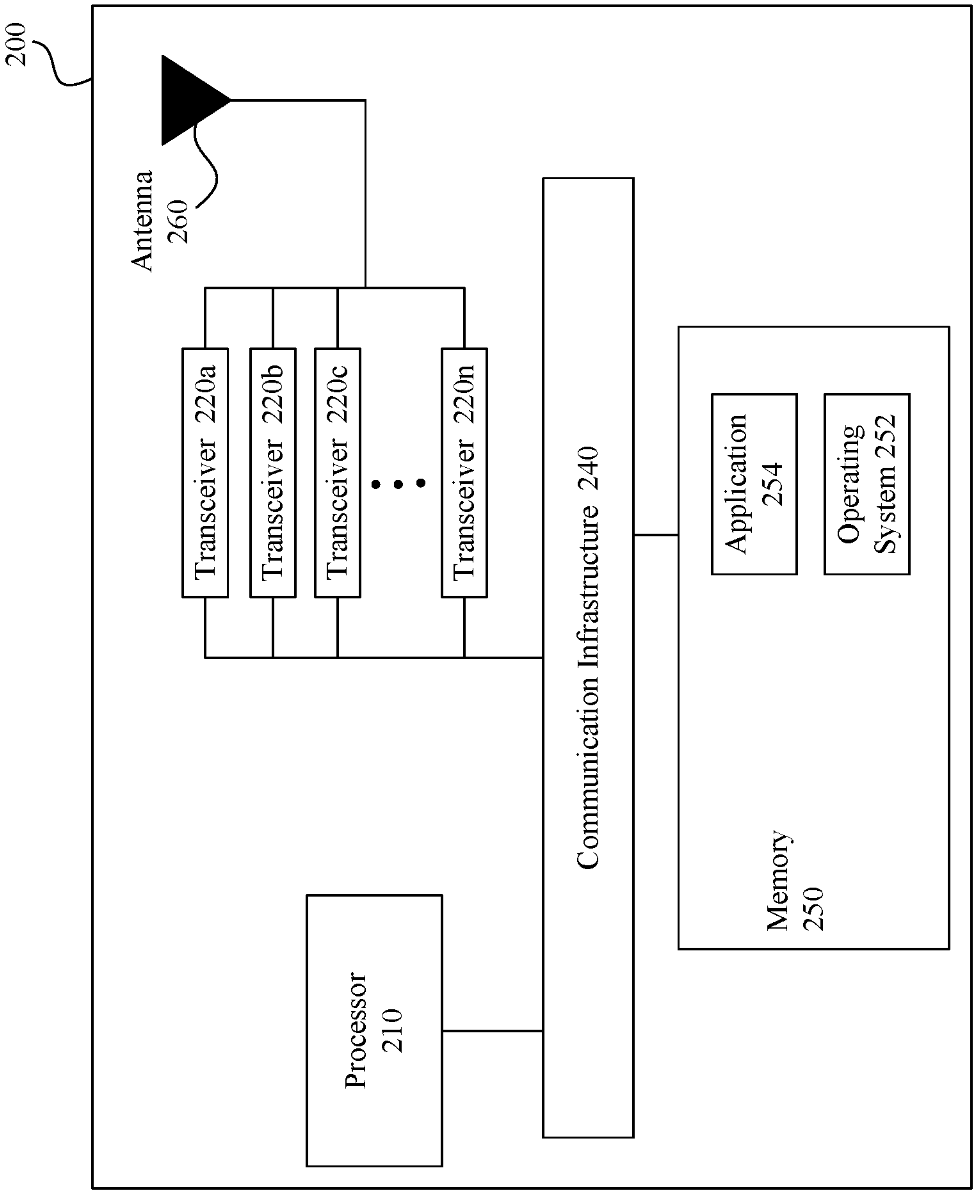
FIG. 2 illustrates a block diagram of an example system of an electronic device implementing mechanisms for providing signaling and procedures to indicate a mode of communication of a wireless communication system, according to some aspects of the disclosure.

FIG. 2 illustrates a block diagram of an example system of an electronic device implementing mechanisms for providing signaling and procedures to indicate a mode of communication of a wireless communication system, according to some aspects of the disclosure. System 200 may be any of the electronic devices (e.g., base stations 101, 103, UE 105) of wireless network 100. System 200 includes processor 210, one or more transceivers 220*a*-220*n*, communication infrastructure 240, memory 250, operating system 252, application 254, and antenna 260. Illustrated systems are provided as exemplary parts of system 200, and system 200 can include other circuit(s) and subsystem(s) as will be understood by those skilled in art. Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220*a*-220*n*. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanisms and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to radio streaming, video streaming, remote control, and/or other user applications.

System 200 can also include communication infrastructure 240. Communication infrastructure 240 provides communication between, for example, processor 210, one or more transceivers 220*a*-220*n*, and memory 250. In some implementations, communication infrastructure 240 may be a bus. Processor 210 together with instructions stored in memory 250 performs operations enabling system 200 to implement mechanisms for providing signaling and procedures to indicate a mode of communication of a wireless communication system, as described herein.

One or more transceivers 220*a*-220*n* transmit and receive communications signals that support mechanisms for providing signaling and procedures to indicate a mode of communication of a wireless communication system, according to some aspects, and may be coupled to antenna 260. Antenna 260 may include one or more antennas that may be the same or different types. One or more transceivers 220*a*-220*n* allow system 200 to communicate with other devices that may be wired and/or wireless. In some examples, one or more transceivers 220*a*-220*n* can include processors, controllers, radios, sockets, plugs, buffers, and like circuits/devices used for connecting to and communication on networks. According to some examples, one or more transceivers 220*a*-220*n* include one or more circuits to connect to and communicate on wired and/or wireless networks.

According to some aspects, one or more transceivers 220*a*-220*n* can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220*a*-220*n* can include more or fewer systems for communicating with other devices.

In some examples, one or more transceivers 220*a*-220*n* can include one or more circuits (including a WLAN transceiver) to enable connection(s) and communication over WLAN networks such as, but not limited to, networks based on standards described in IEEE 802.11. Additionally, or alternatively, one or more transceivers 220*a*-220*n* can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220*n* can include a Bluetooth™ transceiver.

Additionally, one or more transceivers 220*a*-220*n* can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), 5G, and the like. For example, one or more transceivers 220*a*-220*n* can be configured to operate according to one or more of Rel-15, Rel-16, Rel-17, Rel-18, or other of 3GPP standards.

According to some aspects, processor 210, alone or in combination with computer instructions stored within memory 250, and/or one or more transceiver 220*a*-220*n*, implements operations for providing signaling and procedures to indicate (by the base station) or determine (by the UE) a mode of communication of a wireless communication system, as further described herein in FIGS. 4A-4B and FIGS. 5A-5B. Alternatively, the processor 209 can be "hard-coded" to perform these operations.

Figure 3:
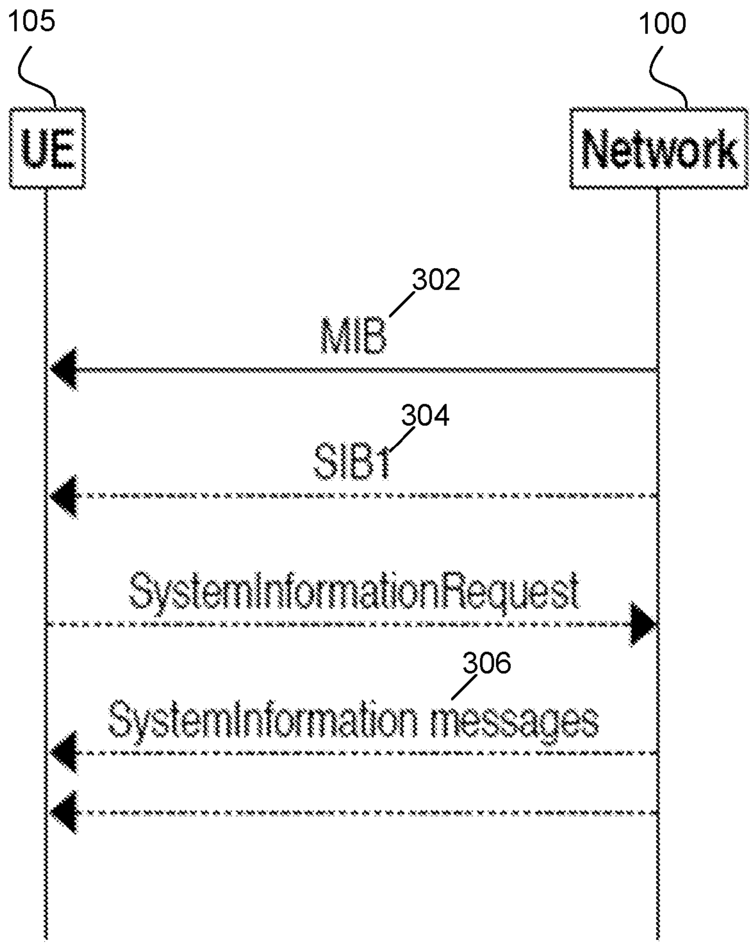
FIG. 3 is a diagram that illustrates an example system information acquisition procedure, according to some aspects of the disclosure.

FIG. 3 is a diagram that illustrates an example system information acquisition procedure, according to some aspects of the disclosure. As a convenience and not a limitation, FIG. 3 may be described with regard to elements of FIGS. 1-2. FIG. 3 may be associated with one or more electronic devices (for example, UE 105 and base stations 101 and 103 of FIG. 1) to perform a system information acquisition procedure in accordance with operate using 3GPP standard. The example system information acquisition procedure of FIG. 3 may also be performed by system 200 of FIG. 2 and/or computer system 600 of FIG. 6. However, FIG. 3 is not limited to the specific aspects depicted in those figures and other systems may be used to perform the system information acquisition procedure as will be understood by those skilled in the art. It is to be appreciated that not all operations may be needed, and the operations may not be performed in the same order as shown in FIG. 3.

Referring to FIG. 3, UE 105 communicates with a network (e.g., System 100) for system information acquisition, in accordance with the system information acquisition procedure as described with reference to 3GPP procedures, for example 3GPP Technical Specification (TS) 38.331. UE 105 can apply the system information acquisition procedure as described with reference to section 5.2.2 of 3GPP TS 38.331 to acquire the Access Stratum (AS) and Non-access Stratum (NAS) related system information broadcasted by the network. The system information acquisition procedure can apply to UE 105 in RRC_IDLE state, in RRC_INACTIVE state and in RRC_CONNECTED state.

According to some aspects, System Information (SI) is the information broadcast by the Network that needs to be acquired by the User Equipment (UE) to be able to access and operate within the network. As described with reference to section 5.2 of 3GPP TS 38.331, SI is divided into Master Information Block (MIB) 302 and a number of System. Information Blocks (SIBs) and posSIBs, and the MIB 302 includes parameters that are needed to acquire SIB type 1 (SIB1) 304 from the cell. SIB1 304 includes information regarding the availability and scheduling (e.g. mapping of SIBs to SI message, periodicity, SI-window size) of other SIBs with an indication whether one or more SIBs are only provided on-demand, and the configuration needed by the UE to perform the SI request. SIB1 304 is a cell-specific SIB. SIBs other than SIB1 and posSIBs are carried in SystemInformation (SI) messages 306 that are responsive a UE system information request 304. Only SIBs or posSIBs having the same periodicity can be mapped to the same SI message. SIBs and posSIBs are mapped to the different SI messages. Each SI message is transmitted within periodically occurring time domain windows (referred to as SI-windows with same length for all SI messages). Any SIB or posSIB except SIB1 can be configured to be cell specific or area specific, using an indication in SIB1.

According to some aspects, signaling and procedures to indicate a mode of communication of a base station may include, but not limited to the example system information acquisition procedure in FIG. 3. The example system information acquisition procedure in FIG. 3 can include, but are not limited to, a system information acquisition procedure described in 3GPP TS 38.331. The example system information acquisition procedure in FIG. 3 can be based on one or more other technical specifications associated with 3rd Generation Partnership Project (3GPP) standards.

Figure 4A:
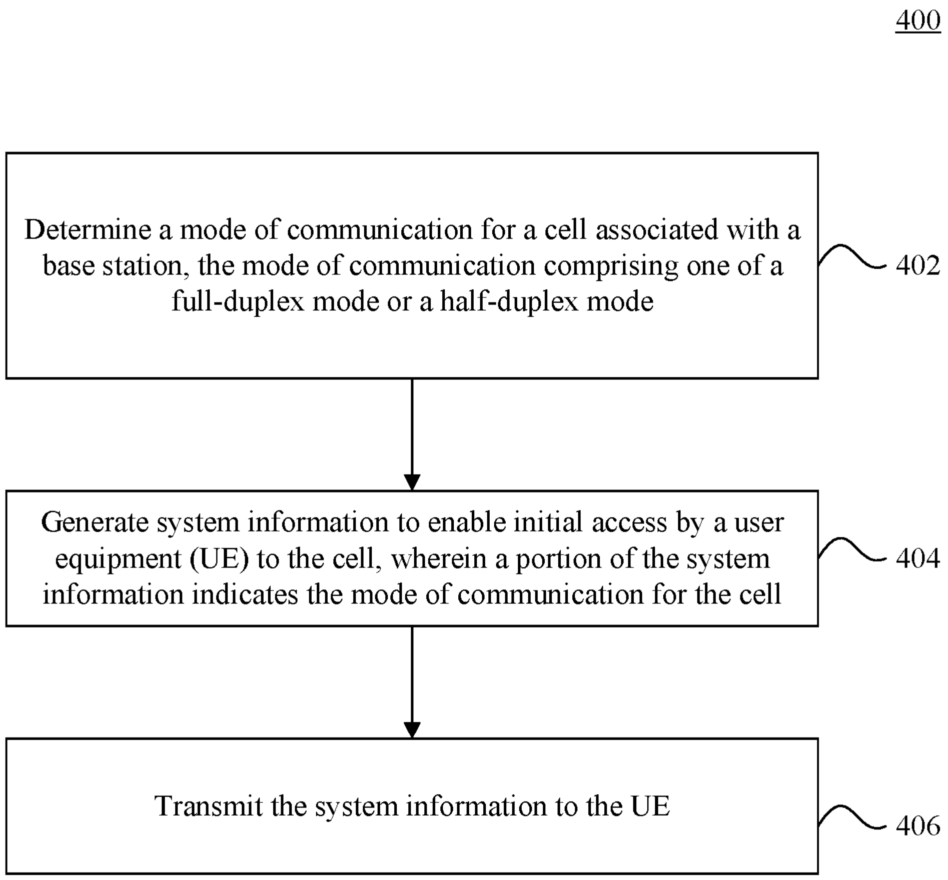
FIG. 4A illustrates an example method for a system (for example, a base station) for providing signaling and procedures to indicate a mode of communication, according to some aspects of the disclosure.

FIG. 4A illustrates an example method for a base station (for example, base station 101 or base station 103) for providing signaling and procedures to indicate a mode of communication, according to some aspects of the disclosure. Method 400 can be applicable to wireless systems, e.g., a wireless communication system based on 3rd Generation Partnership Project (3GPP) release 18 (Rel-18), or others. As a convenience and not a limitation, FIG. 4A may be described with regard to elements of FIGS. 1-2. Method 400 may represent the operation of an electronic device (for example, base station 101 of FIG. 1) implementing mechanisms for providing signaling and procedures to indicate a mode of communication. Method 400 may also be performed by system 200 of FIG. 2 and/or computer system 600 of FIG. 6. However, method 400 is not limited to the specific aspects depicted in those figures and other systems may be used to perform the method as will be understood by those skilled in the art. It is to be appreciated that not all operations may be needed, and the operations may not be performed in the same order as shown in FIG. 4A.

At 402, a mode of communication for a cell associated with the base station is determined. The mode of communication can include one of a full-duplex mode or a half-duplex mode. For example, base station 101 can determine a mode of communication of cell 102 to a full-duplex mode or a half-duplex mode.

At 404, system information to enable initial access by a user equipment (UE) to the cell is generated. A portion of the system information can indicate the mode of communication for the cell. For example, base station 101 can generate system information to enable initial access by UE 105 to the cell 102. The portion of the system information can include a MIB configured to indicate the mode of communication associated with the cell, and/or a SIB configured to indicate the mode of communication associated with the cell, as further shown in FIG. 4B.

According to some aspects, the portion of the system information can include a MIB configured to indicate the mode of communication associated with the cell (e.g., cell 102). Example MIB fields and field descriptions can be found in Table 1 as below and described in section 6.2.2 of 3GPP TS 38.331. The MIB can include an intraFrequencyReselection bit configured to indicate whether the cell is operating in full-duplex mode or half-duplex mode, or a spare bit in the MIB configured to indicate whether the cell is operating in full-duplex mode or half-duplex mode, or when the cell is operating in FR1 licensed band, a reserved bit in a Physical Broadcast Channel (PBCH) payload configured to indicate whether the cell is operating in the full-duplex mode or the half-duplex mode. One of the intraFrequencyReselection bit, the spare bit, or the reserved bit in the PBCH payload for inclusion in the MIB to indicate the mode of communication associated with the cell can be generated.

```
MIB ::=                        SEQUENCE {
  systemFrame Number             BIT STRING (SIZE (6) ),
  subCarrierSpacingCommon        ENUMERATED (scs15or60,
                               scs30or120),
  ssb-SubcarrierOffset           INTEGER (0..15),
  dmrs-TypeA-Position            ENUMERATED {pos2, pos3},
  pdcch-ConfigSIB1               PDCCH-ConfigSIB1,
  cellBarred                     ENUMERATED {barred, notBarred},
  intraFreqReselection           ENUMERATED { allowed, notAl-
                               lowed},
  spare                          BIT STRING (SIZE (1))
}
-- TAG-MIB-STOP
-- ANS1STOP
```

TABLE 1

| Example MIB fields and field descriptions, section 6.2.2 of 3GPP TS 38.331<br>MIB field descriptions |
|---|
| cellBarred |
| Value barred means that the cell is barred, as defined in TS 38.304[20]. This field is ignored by IAB-MT.<br>dmrs-TypeA-Position |
| Position of (first) DM-RS for downlink (see TS 38.211[16], clause 7.4.1.1.2) and uplink (see TS 38.211[16], clause 6.4.1.1.3). |

TABLE 1-continued

| Example MIB fields and field descriptions, section 6.2.2 of 3GPP TS 38.331<br>MIB field descriptions |
|---|
| intraFreqReselection |
| Controls cell selection/reselection to intra-frequency cells when the highest ranked cell is barred, or treated as barred by the UE. as specified in TS 38.304[20]. This field is ignored by IAB-MT. |
| pdcch-ConfigSIB1 |
| Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213[13], clause 13). |
| ssb-SubcarrierOffset |
| Corresponds to $k_{SSB}$ (see TS 38.213 [13]), which is the frequency domain offset between SSB and the overall resource block grid in number of subcarriers. (See TS 38.211[16], clause 7.4.3.1). For operation with shared spectrum channel access (see 37.213[48]), this field corresponds to $\overline{k}_{SSB}$, and kssB is obtained from $\overline{k}_{SSB}$ (see TS 38.211[16], clause 7.4.3.1); the LSB of this field is used also for deriving the QCL relation between SS/PBCH blocks as specified in TS 38.213[13], clause 4.1.<br>The value range of this field may be extended by an additional most significant bit encoded within PBCH as specified in TS 38.213[13].<br>This field may indicate that this cell does not provide SIB1 and that there is hence no CORESET#0 configured in MIB (see TS 38.213 [13], clause 13). In this case, the field pdcch-ConfigSIB1 may indicate the frequency positions where the UE may (not) find a SS/PBCH with a control resource set and search space for SIB1 (see TS 38.213[13], clause 13). |
| subCarrierSpacingCommon |
| Subcarrier spacing for SIB1, Msg.2/4 and MsgB for initial access, paging and broadcast SI-messages. If the UE acquires this MIB on an FRI carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz. For operation with shared spectrum channel access (see 37.213 [48]), the subcarrier spacing for SIB1, Msg.2/4 and MsgB for initial access, paging and broadcast SI-messages is same as that for the corresponding SSB and this field instead is used for deriving the QCL relation between SS/PBCH blocks as specified in TS 38.213[13], clause 4.1. |
| systemFrameNumber |
| The 6 most significant bits (MSB) of the 10-bit System Frame Number (SFN). The 4 LSB of the SFN are conveyed in the PBCH transport block as part of channel coding (i.e. outside the MIB encoding), as defined in clause 7.1 in TS 38.212[17]. |

According to some aspects, the portion of the system information can include a MIB configured to indicate the mode of communication associated with the cell using the following options.

Option 1—in this Example:

For a wireless communication system based on 3rd Generation Partnership Project (3GPP) release 18 (Rel-18), or others, the intraFreqReselection bit can be repurposed in the MIB. For example, the intraFreqReselection bit can be repurposed to indicate whether the cell is operating in full-duplex mode or half-duplex mode, when the cellBarred field in the MIB is NOT set to barred. For example, the intraFreqReselection bit can be set to 1 to indicate the cell is operating in full-duplex mode. And, the intraFreqReselection bit can be set to 0 to indicate the cell is operating in half-duplex. Alternatively, the intraFreqReselection bit can be set to 0 to indicate the cell is operating in full-duplex mode. And, the intraFreqReselection bit can be set to 1 to indicate the cell is operating in half-duplex.

Option 2—in this Example:

For a wireless communication system based on 3rd Generation Partnership Project (3GPP) release 18 (Rel-18), or others, the spare bit in the MIB can be configured to indicate whether the cell is operating in full-duplex mode or half-duplex mode. For example, the spare bit can be set to 1 toindicate the cell is operating in full-duplex mode. And the spare bit can be set to 0 to indicate the cell is operating in half-duplex mode.

Option 3—in this Example:

For a wireless communication system based on 3rd Generation Partnership Project (3GPP) release 18 (Rel-18), or others, for Frequency Range 1 (FR1) licensed band, one of reserved bits, such as $a_{A+6}$, $a_{A+7}$, can be repurposed in a PBCH payload to indicate whether this cell is operating in full-duplex mode or half-duplex mode.

According to some aspects, the portion of the system information can include a SIB configured to indicate the mode of communication associated with the cell (e.g., cell 102). The SIB can include a SIB type 1 (SIB1) configured to indicate whether the cell is operating in full-duplex mode or half-duplex mode, and/or Other System Information (OSI) configured to indicate whether the cell is operating in full-duplex mode or half-duplex mode.

According to some aspects, the portion of the system information can include SIB1 configured to indicate whether the cell is operating in full-duplex mode or half-duplex mode. Example SIB1 fields and field descriptions can be found in Table 2 as below and described in section 6.2.2 of 3GPP TS 38.331, which is incorporated herein in its entirety. The cellSelectionInfo field within SIB1 defines parameters for cell selection related to the serving cell. According to some aspects, a parameter in cellSelectionInfo field in SIB1 can be configured to indicate whether the cell is operating in full-duplex mode or half-duplex mode. The parameter in cellSelectionInfo field can be one of a first offset with respect to an existing cell selection receive value (Srxlev) associated with average interference observed by the UE when operating in full-duplex mode, or a second offset with respect to an existing cell selection quality value (Squal), or a third offset applied to both Srxlev and Sqaul. The parameter in the cellSelectionInfo field can be associated with Example Cell Selection Criterion and associated parameters can be found in Table 3 and as described in section 5.2.3.2 of 3GPP TS 38.304.

```
SIB1 :: = SEQUENCE {
  cellSelectionInfo          SEQUENCE {
    q-RxLevMin                          Q-RxLevMin,
    q-RxLevMinOffset                    INTEGER (1..8)              OPTIONAL, -- Need S
    q-RxLevMinSUL                       Q-RxLevMin                  OPTIONAL, -- Need R
    q-QualMin                           Q-QualMin                   OPTIONAL, -- Need S
    q-QualMinOffset                     INTEGER (1..8)              OPTIONAL -- Need S
  }                                                                 OPTIONAL, -- Cond Standalone
  cellAccessRelatedInfo             CellAccessRelatedInfo,
  connEstFailureControl             ConnEstFailureControl           OPTIONAL, -- Need R
  si-SchedulingInfo                 SI-SchedulingInfo               OPTIONAL, -- Need R
  servingCellConfigCommon           ServingCellConfigCommonSIB      OPTIONAL, -- Need R
  ims-Emergency Support             ENUMERATED {true}               OPTIONAL, -- Need R
  eCallOverIMS-Support              ENUMERATED {true}               OPTIONAL, -- Need R
  ue-TimersAndConstants             UE-TimerAndConstrants           OPTIONAL, -- Need R
    uac-BarringInfo                 SEQUENCE {
    uac-BarringForCommon                UAC-BarringPerCatList       OPTIONAL, -- Need S
    uac-BarringPerPLMN-List             UAC-BarringPerPLMN-List     OPTIONAL, -- Need S
    uac-BarringInfoSetList              UAC-BarringInfoSetList,
    uac-AccessCategory 1-SelectionAssistanceInfo CHOICE {
      plmnCommon                            UAC-AccessCategory 1-SelectionAssistanceInfo,
      individualPLMNList SEQUENCE (SIZE (2..maxPLMN)) OF UAC-AccessCategory 1-SelectionAssistanceInfo
    }                                                               OPTIONAL, -- Need S
  }                                                         OPTIONAL, -- Need R
  useFullResumeID            ENUMERATED {true}                      OPTIONAL, -- Need R
  lateNonCriticalExtension   OCTET STRING                           OPTIONAL, --
  nonCriticalExtension       SIB1-v1610-IEs                         OPTIONAL
}
SIB1-v1610-IEs :: =        SEQUENCE {
  idleModeMeasurementsEUTRA-r16         ENUMERATED {true}           OPTIONAL, -- Need R
  idleModeMeasurementsNR-r16            ENUMERATED {true}           OPTIONAL, -- Need R
  posSI-SchedulingInfo-r16            PosSI-SchedulingInfo-r16      OPTIONAL, -- Need R
  nonCriticalExtension                SIB1-v16xy-IEs                OPTIONAL
}
SIB1-v16xy-IEs :: =            SEQUENCE {
  uac-BarringInfo-v16xy            SEQUENCE {
    uac-AC1-SelectAssistInfo-r16          SEQUENCE (SIZE (2.maxPLMN)) OF UAC-ACI-SelectAssistInfo-r16
  }                                                                 OPTIONAL, -- Need R
  nonCriticalExtension         SEQUENCE { }                         OPTIONAL
}
UAC-AccessCategory 1-SelectionAssistanceInfo ::= ENUMERATED {a, b, c}
UAC-ACI-SelectAssistInfo-r16 :: =        ENUMERATED {a, b, c, notConfigured}
-- TAG-SIB1-STOP
-- ASNISTOP
```

TABLE 2

| Example SIB1 fields and field descriptions, section 6.2.2 3GPP TS 38.331<br>SIB1 field descriptions |
|---|
| cellSelectionInfo |
| Parameters for cell selection related to the serving cell. |
| eCallOverIMS-Support |
| Indicates whether the cell supports eCall over IMS services as defined in TS 23.501[32]. If absent, eCall over IMS is not supported by the network in the cell. |
| idleModeMeasurementsEUTRA |
| This field indicates that a UE that is configured for EUTRA idle/inactive measurements shall perform the measurements while camping in this cell and report availability of these measurements when establishing or resuming a connection in this cell. If absent, a UE is not required to perform EUTRA idle/inactive measurements. |
| idleModeMeasurementsNR |
| This field indicates that a UE that is configured for NR idle/inactive measurements shall perform the measurements while camping in this cell and report availability of these measurements when establishing or resuming a connection in this cell. If absent. a UE is not required to perform NR idle/inactive measurements. |

TABLE 2-continued

| Example SIB1 fields and field descriptions, section 6.2.2 3GPP TS 38.331<br>SIB1 field descriptions |
|---|
| ims-EmergencySupport |
| Indicates whether the cell supports IMS emergency bearer services for UEs in limited service mode. If absent, IMS emergency call is not supported by the network in the cell for UEs in limited service mode. |
| q-QualMin |
| Parameter "$Q_{qualmin}$" in TS 38.304[20], applicable for serving cell. If the field is absent, the UE applies the (default) value of negative infinity for $Q_{qualmin}$. |
| q-QualMinOffset |
| Parameter "$Q_{qualminoffset}$" in TS 38.304[20]. Actual value $Q_{qualminoffset}$ = field value [dB]. If the field is absent, the UE applies the (default) value of 0 dB for $Q_{qualminoffset}$. Affects the minimum required quality level in the cell. |
| q-RxLevMin |
| Parameter "$Q_{rxlevmin}$" in TS 38.304 [20], applicable for serving cell. |
| q-RxLevMinOffset |
| Parameter "$_{Qrxlevminoffset}$" in TS 38.304[20]. Actual value $Q_{rxlevminoffset}$ = field value *2 [dB]. If absent, the UE applies the (default) value of 0 dB for $Q_{xlevminoffset}$. Affects the minimum required Rx level in the cell. |
| q-RxLevMinSUL |
| Parameter "$_{Qrxlevmin}$" in TS 38.304[20], applicable for serving cell. |
| servingCellConfigCommon |
| Configuration of the serving cell. |
| uac-AccessCategory1-SelectionAssistanceInfo |
| Information used to determine whether Access Category 1 applies to the UE, as defined in TS 22.261 [25]. If plmnCommon is chosen, the UAC-AccessCategory1-SelectionAssistanceInfo is applicable to all the PLMNs in plmn-IdentityList. If individualPLMNList is chosen, the 1st entry in the list corresponds to the first PLMN in plmn-IdentityList, the $2^{nd}$ entry in the list corresponds to the second PLMN in plmn-IdentityList and so on. If uac-ACI-SelectAssistInfo-r16 is present, the UE shall ignore the uac-AccessCategory1-SelectionAssistanceInfo. |
| uac-AC1-SelectAssistInfo |
| Information used to determine whether Access Category 1 applies to the UE, as defined in TS 22.261 [25]. The $1^{st}$ entry in the list corresponds to the first PLMN in plmn-IndentityList, the $2^{nd}$ entry in the list corresponds to the second PLMN in plmn-IdentityList and so on. Value notConfigured indicates that Access Category1 is not configured for the corresponding PLMN. |
| uac-BarringForCommon |
| Common access control parameters for each access category. Common values are used for all PLMNs, unless overwritten by the PLMN specific configuration provided in uac-BarringPerPLMN-List. The parameters are specified by providing an index to the set of configurations (uac-BarringInfoSetList). UE behaviour upon absence of this field is specified in clause 5.3.14.2. |
| ue-TimersAndConstants |
| Timer and constant values to be used by the UE. The cell operating as PCell always provides this field. |

TABLE 3

| Cell Selection Criterion, section 5.2.3.2 of 3GPP TS 38.304 | |
|---|---|
| Srxlev | Cell selection RX level value (dB) |
| Squal | Cell selection quality value (dB) |
| $Qoffset_{temp}$ | Offset temporarily applied to a cell as specified in TS 38.331[3] (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, $Q_{rxlevmin}$ is obtained from g-RxLevMinSUL, if present. in SIB1, SIB2 and SIB4. additionally, if $Q_{rxlevminoffsetcellSUL}$ is present in SIB3 and SIB4 for the concerned cell. this cell specific offset is added to the corresponding $Q_{rxleymin}$ to achieve the required minimum RX level in the concerned cell; else $Q_{rxlevmin}$ is obtained from q-RxLevMin in SIB1, SIB2 and SIB4, additionally, if $Q_{rxlevminoffsetcell}$ is present in SIB3 and SIB4 for the concerned cell. this cell specific offset is added to the corresponding $Q_{rxlevmin}$ to achieve the required minimum RX level in the concerned cell. |
| $Q_{qualmin}$ | Minimum required quality level in the cell (dB). Additionally. if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122[9]. |

TABLE 3-continued

| Cell Selection Criterion, section 5.2.3.2 of 3GPP TS 38.304 | |
|---|---|
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122[9]. |
| $P_{compensation}$ | For FR1, if the UE supports the additionalPmax in the NR-NS-PmaxList, if present, in SIB1, SIB2 and SIB4: $\max(P_{EMAX1}-P_{PowerClass}, 0) - (\min(P_{EMAX2}, P_{PowerClass}) - \min(P_{EMAX1}, P_{PowerClass}))$ (dB); else: $\max(P_{EMAX1} - P_{PowerClass}, 0)$ (dB) For FR2, P compensation is set to 0. For IAB-MT, $P_{compensation}$ is set to 0. |
| $P_{EMAX1}$, $P_{EMAX2}$ | Maximum TX power level of a UE may use when transmitting on the uplink in the cell (dBm) defined as $P_{EMAX}$ in TS 38.101[15]. If UE supports SUL frequency for this cell. $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331[3], else PEMAX1 and PEMAX2 are obtained from the p-Max and NR-NS-PmaxList respectively in SIB1, SIB2 and SIB4 for normal UL as specified in TS 38.331[3]. |
| $P_{PowerClass}$ | Maximum RF output power of the UE (dBm) according to the UE power class as defined in TS 38.101-1[15]. |

According to some aspects, the portion of the system information can include SIB1 configured to indicate the mode of communication associated with the cell (e.g., cell 102) using the following options.

Option 1:—in this Example:

For a wireless communication system based on 3rd Generation Partnership Project (3GPP) release 18 (Rel-18), or others, a parameter can be introduced in cellSelectionInfo field in SIB1, and can be expressed as Qrxlevminoffset2. The parameter can be proposed to represent an additional offset to the Qrxlevmin for Srxlev. The additional offset can represent the average interference (e.g., in dB) observed at UE operating due to full-duplex mode of the serving cell. The parameter can be applied in Cell Selection Criterion as described in section 5.2.3.2 of 3GPP TS 38.304 in the following equation:

$$\text{Srxlev}=\text{Qrxlevmeas}-(\text{Qrxlevmin}+\text{Qrxlevminoffset}+\text{Qrxlevminoffset2})-\text{Pcompensation}-\text{Qoffsettemp} \quad \text{Equation (1).}$$

Option 2:—in this Example:

For a wireless communication system based on 3rd Generation Partnership Project (3GPP) release 18 (Rel-18), or others, a parameter can be introduced in cellSelectionInfo field in SIB1, and can be expressed as Qqualminoffset2. The parameter can be proposed to represent an additional offset to the Qqualminoffset for Squal. The parameter can be applied in c Cell Selection Criterion as described in section 5.2.3.2 of 3GPP TS 38.304 ell-selection criteria (38.304, 5.2.3.2) in the following equation:

$$\text{Squal}=\text{Qqualmeas}-(\text{Qqualmin}+\text{Qqualminoffset}+\text{Qqualminoffset2})-\text{Qoffsettemp} \quad \text{Equation (2).}$$

Option 3:—in this Example:

For a wireless communication system based on 3rd Generation Partnership Project (3GPP) release 18 (Rel-18), or others, a parameter can be introduced in cellSelectionInfo in SIB1, and can be expressed as Qoffsettemp2. The parameter can be proposed to represent an additional offset to Srxlev and Squal. The parameter can be applied in Cell Selection Criterion as described in section 5.2.3.2 of 3GPP TS 38.304 in the following equations:

$$\text{Srxlev}=\text{Qrxlevmeas}-(\text{Qrxlevmin}+\text{Qrxlevminoffset}+\text{Qoffsettemp2})-\text{Pcompensation}-\text{Qoffsettemp} \quad \text{Equation (3).}$$

$$\text{Squal}=\text{Qqualmeas}-(\text{Qqualmin}+\text{Qqualminoffset}+\text{Qoffsettemp2})-\text{Qoffsettemp} \quad \text{Equation (4).}$$

Option 4:—in this Example:

For a wireless communication system based on 3rd Generation Partnership Project (3GPP) release 18 (Rel-18), or others, a parameter can be introduced in cellSelectionInfo fieldin SIB1, and can be expressed based on a combination of the Options 1-3 and Equations (1)-(4) as described above. However, the aspects of this disclosure are not limited to these examples.

According to some aspects, the portion of the system information can include OSI configured to indicate whether the cell (e.g., cell 102) is operating in full-duplex mode or half-duplex mode. The OSI can include a new SIB configured to have an indication of full-duplex mode or half-duplex mode of the cell. Additionally, or alternatively, the OSI can include an existing SIB other than SIB1 configured to have an indication of full-duplex mode or half-duplex mode of the cell. For example, the existing SIB other than SIB1 in OSI can include SIB2, SIB3, SIB5, SIB6, SIB7, SIB8, SIB9, SIB10, SIB11, SIB12, SIB13, SIB14, or others. The indication of support of full-duplex mode at the cell can be implicit or explicit. For example, an implicit indication can include using separate Physical Random Access Channel (PRACH) resources, by preamble and/or occasions, for a UE (e.g., UE 105) supporting full-duplex mode. Modes of communication, such as full-duplex mode or half-duplex mode, of the serving cell (e.g., cell 102) and neighbor cell (e.g., cell 103) may be included in the same SIB in OSI. The si-BroadcastStatus field within SchedulingInfo field in SIB1 can be configured to notBroadcasting. UE (e.g., UE 105) can request for SI to indicate the serving cell's mode of communication, such as full-duplex mode or half-duplex mode. Overhead may be saved in the SI transmission, and transmission of SI carrying information on duplexing mode can occur only when needed, for example, when UE sends a request.

According to some aspects, as described above, the portion of the system information can include MIB, SIB1, and/or OSI configured to indicate the mode of communication associated with the cell (e.g., cell 102). The portion of the system information discussed above are provided as examples and do not limit the aspects of this disclosure. For example, the portion of the system information can include one or more combinations of MIB, SIB1, and/or OSI configured to indicate the mode of communication associated with the cell.

At 406, the system information is transmitted from the base station (e.g., base station 101) to the UE (e.g., UE 105).

According to some aspects, the system information can be transmitted to the UE to enable initial access to a wireless network (e.g., system 100). The UE can determine, based on the mode of communication associated with the cell, whether to camp on the cell.

Additionally, or alternatively, the system information can be transmitted to the UE as an indication of a system information update by the cell in the wireless network. A UE can monitor SI updates. A UE in RRC_CONNECTED state can monitor for a SI change indication in any paging occasion at least once per modification period if the UE is provided with a common search space on the active Bandwidth Part (BWP) to monitor paging, as specified in 3GPP TS 38.213, clause 13. As described in 3GPP TS 38.331, UE in RRC_IDLE state or in RRC_INACTIVE state can monitor for a SI change indication in its own paging occasion every Discontinuous Reception (DRX) cycle.

Figure 4B:
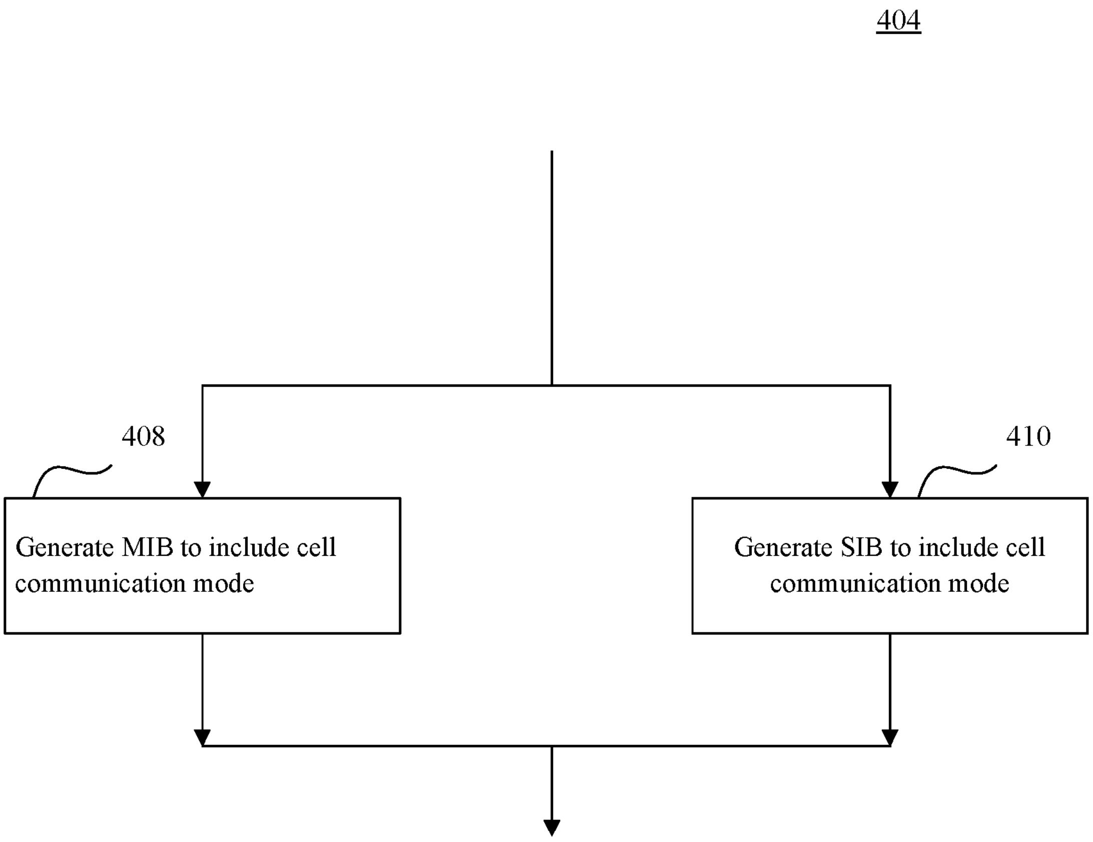
FIG. 4B further illustrates a portion of FIG. 4A of generating system information to enable access by a user equipment to a cell and also provide a mode of communication that is being utilized by the cell.

FIG. 4B further illustrates step 404 in FIG. 4A. As shown in FIG. 4B, the system information having the cell communication mode can be sent using a MIB Transmission or a SIB transmission per the options and detailed discussions above with respect to FIG. 4A. Accordingly, in step 408, the base station generates a MIB transmission having a portion that includes the communication mode of the corresponding cell per the detailed discussion above for MIB options discussed above. Additionally or alternatively, in step 410, the base station generates a SIB transmission having a portion that includes the communication mode of the corresponding cell per the detailed discussion above for SIB options discussed above.

Figure 5A:
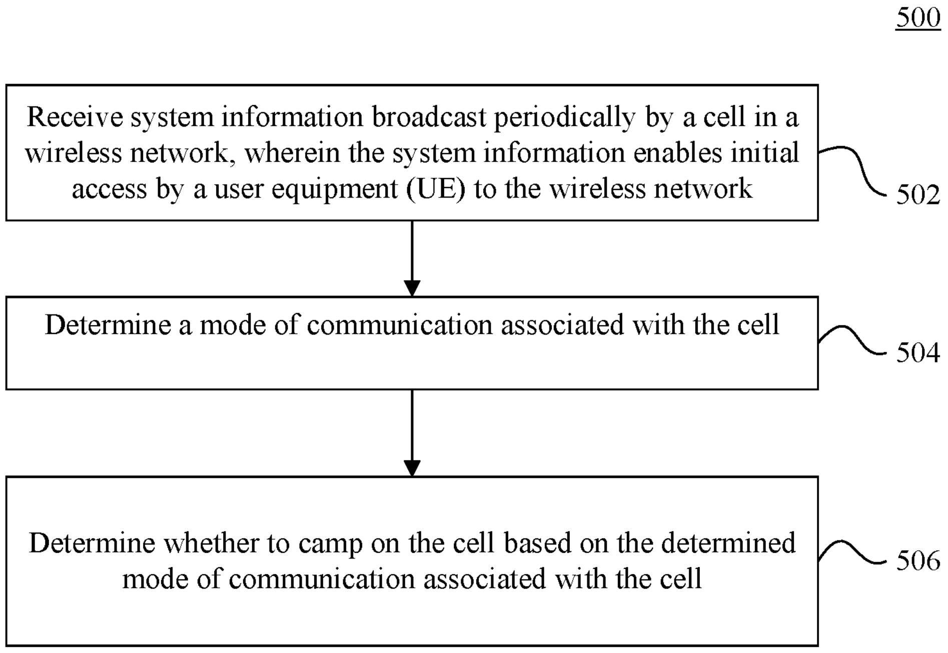
FIG. 5A illustrates another example method for a system (for example, a UE) supporting mechanisms for providing signaling and procedures to indicate a mode of communication, according to some aspects of the disclosure, according to some aspects of the disclosure.

FIG. 5A illustrates another example method for a system (for example, a UE) supporting mechanisms for receiving signaling and procedures to determine a mode of communication for a cell, according to some aspects of the disclosure. Method 500 can be applicable to wireless systems, e.g., a wireless communication system based on 3rd Generation Partnership Project (3GPP) release 18 (Rel-18), or others. As a convenience and not a limitation, FIG. 5A may be described with regard to elements of FIGS. 1-2. Method 500 may represent the operation of an electronic device (for example, UE 105 of FIG. 1) implementing supporting mechanisms for receiving signaling and procedures to determine a mode of communication for a cell. Method 500 may also be performed by system 200 of FIG. 2 and/or computer system 600 of FIG. 6. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5A.

At 502, system information broadcast periodically by a cell in a wireless network is received by a UE (e.g., UE 105). The system information can enable initial access by the UE to the wireless network. For example, UE 105 can receive system information broadcast periodically by base station 101 in a wireless network (e.g., system 100). The system information can be described with reference to FIGS. 3-4 and in accordance with 3GPP TS 38.331. UE 105 can perform a system information acquisition procedure described with reference to FIGS. 3-4 and in accordance with 3GPP TS 38.331.

At 504, a mode of communication associated with the cell is determined based a portion of the system information received by the UE. The mode of communication can include full-duplex mode or half-duplex mode. For example, UE 105 can determine, based a portion of the system information, whether a corresponding cell associated with the base station is operating in full-duplex mode or half-duplex mode with the cell. According to some aspects, as described above, the portion of the system information can include MIB, SIB1, and/or OSI configured to indicate the mode of communication associated with the cell (e.g., cell 102), as described with reference to FIGS. 3-4 and in accordance with 3GPP TS 38.331, and as further described in FIG. 5B.

At 506, the UE determines whether to camp on the cell based on the determined mode of communication associated with the cell. For example, the UE 105 can refrain from, based on the determined mode of communication associated with the cell, camping on the cell and perform a cell re-selection procedure. UE 105 can refrain from, based on the determined full-duplex mode associated with the cell, camping on the cell and perform a cell re-selection procedure in accordance with one or more technical specifications associated with 3rd Generation Partnership Project (3GPP) standards. Alternatively, the UE 105 can establish, based on the determined half-duplex mode associated with the cell, a connection with the cell to enable the UE to camp on the cell.

Figure 5B:
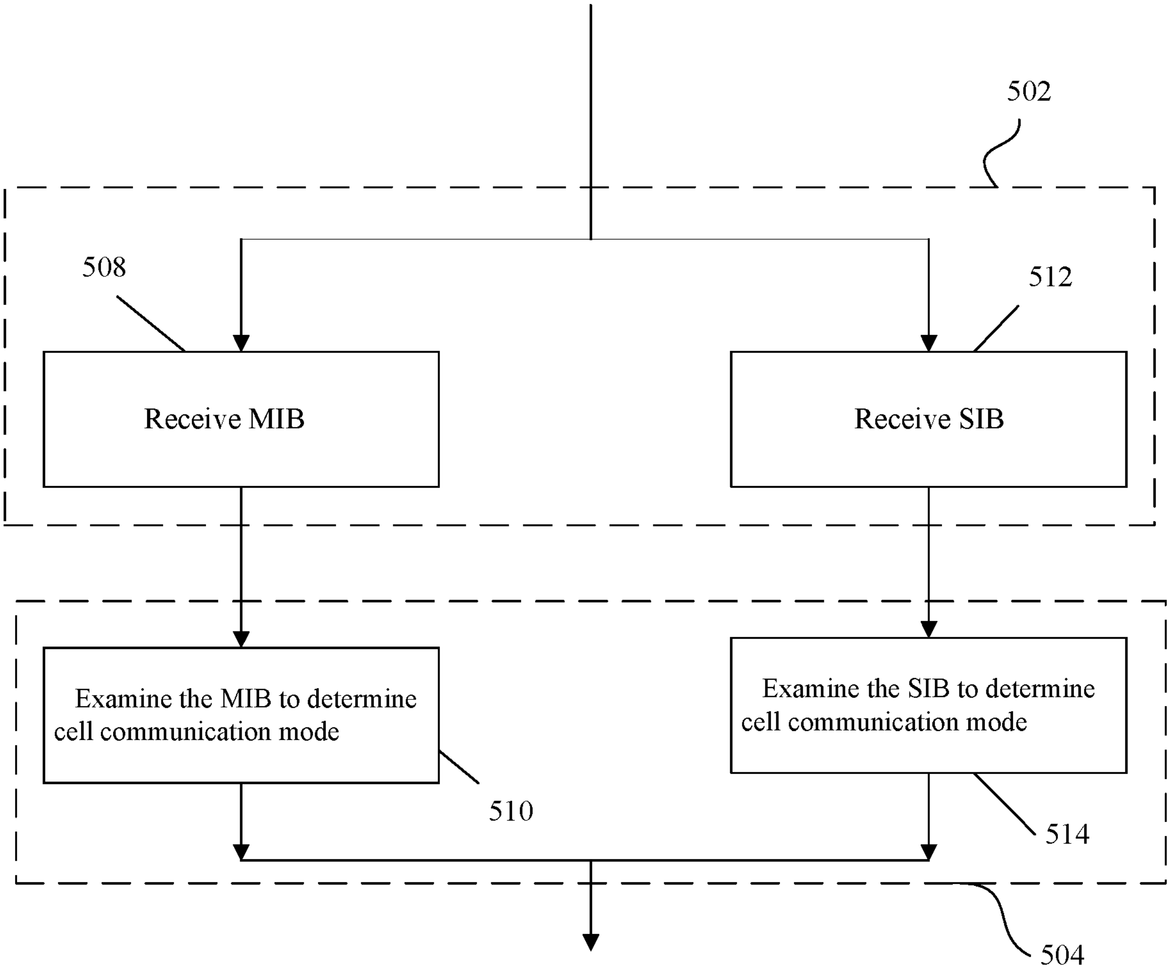
FIG. 5B further illustrates a portion of FIG. 5A of determining a mode of communication that is being utilized by a cell based on system information received from a corresponding base station.

FIG. 5B further illustrates steps 502 and 504 in FIG. 5A. As shown in FIG. 5B, the system information having the cell communication mode can be received via a MIB Transmission or a SIB transmission from the base station per the options and detailed discussions above with respect to FIG. 5A. Accordingly, in step 508, the UE receives a MIB transmission having a portion that includes the communication mode of the corresponding cell per the detailed discussion above for MIB options discussed above. In step 510, the UE examines at least the portion of the MIB to determine the mode of communication of the cell corresponding to the base station that sent the MIB per the options and detailed discussion in FIG. 4A and FIG. 5A. For example, the UE can examine one of the intraFrequencyReselection bit, the spare bit, or the reserved bit in the PBCH payload to determine the mode of communication associated with the cell.

Additionally or alternatively, in step 512, the UE receives a SIB transmission having a portion that includes the communication mode of the corresponding cell per the detailed discussion above for SIB options discussed above. In step 514, the UE examines at least the portion of the SIB to determine the mode of communication of the cell corresponding to the base station that sent the SIB per the options and detailed discussion in FIG. 4A and FIG. 5A. For example, the UE can examine respective portions of a SIB1 configured to indicate whether the cell is operating in the full-duplex mode or the half-duplex mode, or an OSI configured to indicate whether the cell is operating in the full-duplex mode or the half-duplex mode.

Figure 6:
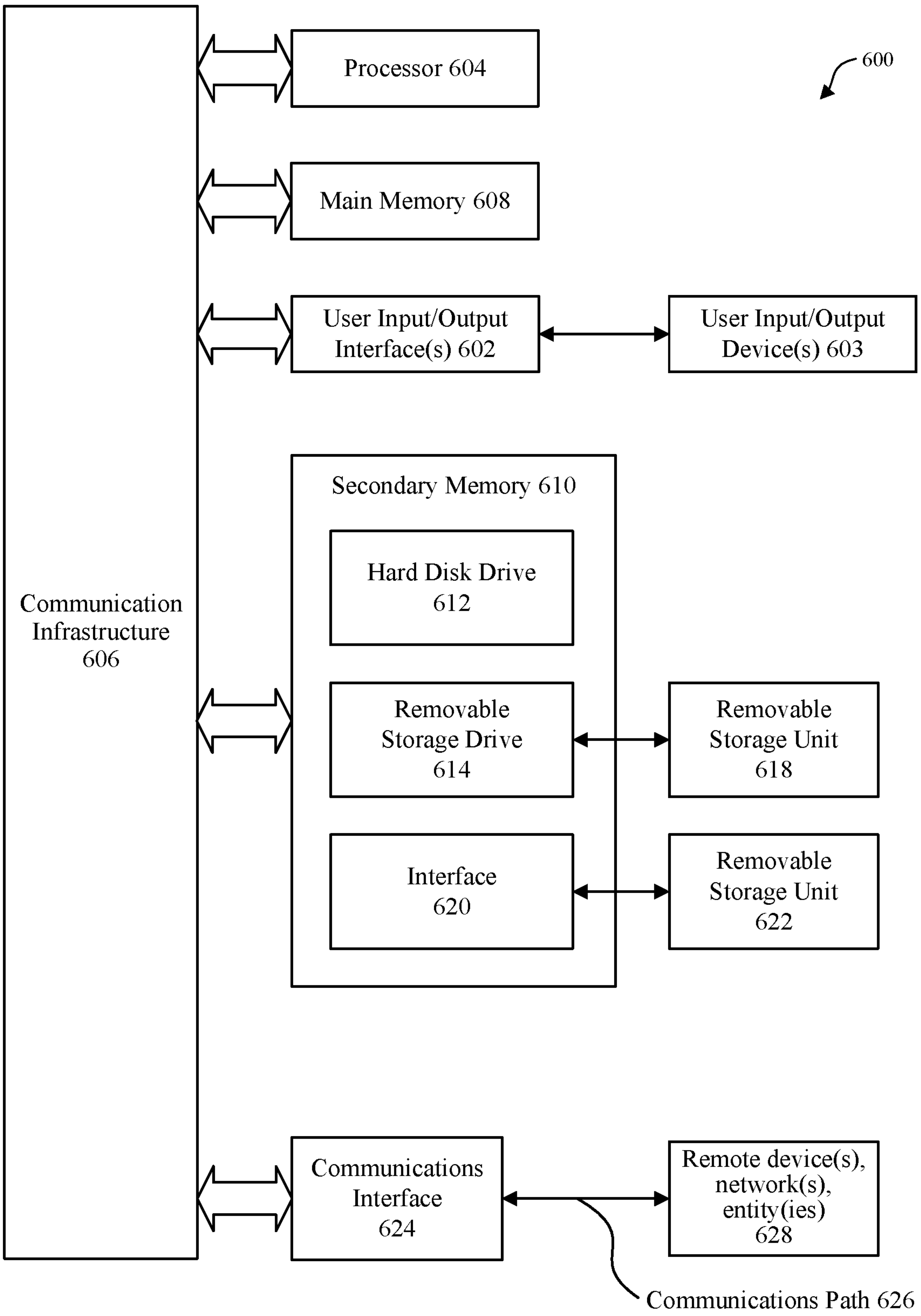
FIG. 6 is an example computer system for implementing some aspects or portion(s) thereof.

Various aspects can be implemented, for example, using one or more computer systems, such as computer system 600 shown in FIG. 6. Computer system 600 can be any well-known computer capable of performing the functions described herein such as devices 101, 105 of FIGS. 1 and/or 200 of FIG. 2. Computer system 600 includes one or more processors (also called central processing units, or CPUs), such as a processor 604. Processor 604 is connected to a communication infrastructure 606 (e.g., a bus.) Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A base station, comprising:

a transceiver configured to wirelessly communicate with a user equipment (UE); and a processor communicatively coupled to the transceiver and configured to:

determine a mode of communication for a cell associated with the base station, the mode of communication comprising one of a full-duplex mode or a half-duplex mode;

generate system information to enable initial access by the UE to the cell, wherein a portion of the system information indicates the mode of communication for the cell, wherein the portion of the system information comprises a System Information Block (SIB), wherein the SIB comprises a System Information Block Type 1 (SIB1), and wherein the SIB1 comprises a parameter in cellSelectionInfo field repurposed to indicate whether the cell is operating in the full-duplex mode or the half-duplex mode; and transmit, using the transceiver, the system information to the UE.

2. The base station of claim 1, wherein the portion of the system information further comprises a Master Information Block (MIB) configured to indicate the mode of communication associated with the cell.

3. The base station of claim 1, wherein the portion of the system information further comprises a Master Information Block (MIB), and wherein the MIB includes:

an intraFrequencyReselection bit repurposed to indicate whether the cell is operating in the full-duplex mode or the half-duplex mode; or based on the cell operating in Frequency Range 1 (FR1) licensed band, a reserved bit in a Physical Broadcast Channel (PBCH) payload repurposed to indicate whether the cell is operating in the full-duplex mode or the half-duplex mode.

4. The base station of claim 1, wherein the parameter in the cellSelectionInfo field is one of:

a first offset with respect to an existing cell selection receive value (Srxlev) associated with an average interference observed by the UE operating in the full-duplex mode; or a second offset with respect to an existing cell selection quality value (Squal); or a third offset applied to both Srxlev and Sqaul.

5. The base station of claim 3, wherein the processor is further configured to:

generate one of the intraFrequencyReselection bit, or the reserved bit in the PBCH payload for inclusion in the MIB to indicate the mode of communication associated with the cell.

6. A method, comprising:

receiving system information periodically by a cell in a wireless network, wherein the system information enables initial access by a user equipment (UE) to the wireless network;

determining, based on a portion of the system information, a mode of communication associated with the cell, the mode of communication comprising one of a full-duplex mode or a half-duplex mode, wherein the portion of the system information comprises a System Information Block (SIB), wherein the SIB comprises a System Information Block Type 1 (SIB1), and wherein the SIB1 comprises a parameter in cellSelectionInfo field repurposed to indicate whether the cell is operating in the full-duplex mode or the half-duplex mode; and determining whether to camp on the cell based on the determined mode of communication associated with the cell.

7. The method of claim 6, wherein the portion of the system information further comprises a Master Information Block (MIB) configured to indicate the mode of communication associated with the cell.

8. The method of claim 6, wherein the portion of the system information further comprises a Master Information Block (MIB), and wherein the MIB includes:

an intraFrequencyReselection bit repurposed to indicate whether the cell is operating in the full-duplex mode or the half-duplex mode; or when the cell is operating in Frequency Range 1 (FR1) licensed band, a reserved bit in a Physical Broadcast Channel (PBCH) payload repurposed to indicate whether the cell is operating in the full-duplex mode or the half-duplex mode.

9. The method of claim 6, wherein the parameter in the cellSelectionInfo field is one of:

a first offset with respect to an existing cell selection receive value (Srxlev) associated with an average interference observed by the UE operating in the full-duplex mode; or a second offset with respect to an existing cell selection quality value (Squal); or a third offset applied to both Srxlev and Sqaul.

10. The method of claim 6, further comprising:

refraining from, based on the determined mode of communication associated with the cell, camping on the cell; and performing a cell re-selection procedure.

11. The method of claim 6, further comprising establishing, based on the determined mode of communication associated with the cell, a connection with the cell to enable the UE to camp on the cell.

12. The method of claim 8, further comprising:

examining one of the intraFrequencyReselection bit, or the reserved bit in the PBCH payload to determine the mode of communication associated with the cell.

* * * * *